United States Patent [19]
Box

[11] Patent Number: 4,816,007
[45] Date of Patent: Mar. 28, 1989

[54] RADIALLY INTERENGAGED VANE COUPLING WITH CIRCUMFERENTIALLY ARRANGED RESILIENT PADS

[75] Inventor: Robert L. Box, Cumbria, United Kingdom

[73] Assignee: Vickers Shipbuilding & Engineering Limited, Cumbria, United Kingdom

[21] Appl. No.: 910,919

[22] Filed: Sep. 24, 1986

[30] Foreign Application Priority Data
Oct. 4, 1985 [GB] United Kingdom ............... 8524497
Aug. 13, 1986 [GB] United Kingdom ............... 8619751

[51] Int. Cl.⁴ ............................................. F16D 3/64
[52] U.S. Cl. ...................................... 464/74; 464/85; 464/154
[58] Field of Search ................... 464/74, 76, 83, 85, 464/94, 95, 96, 147, 152, 153, 154

[56] References Cited

U.S. PATENT DOCUMENTS

| | | | |
|---|---|---|---|
| 1,561,476 | 11/1925 | Masury et al. | 464/74 |
| 2,157,996 | 5/1939 | Brownstein | 464/76 |
| 3,094,853 | 6/1963 | Boschi | 464/74 |
| 3,102,402 | 9/1963 | Stewart | 464/74 |
| 3,505,832 | 4/1970 | Braithwaite | 464/76 |
| 3,731,500 | 5/1973 | Schlums | 464/74 |
| 4,627,885 | 12/1986 | Arlt | 464/83 X |

OTHER PUBLICATIONS

"Fast's Self-Aligning Coupling", Koppers Co., Inc., Catalog No. 47, p. 8, 1950.

*Primary Examiner*—Daniel P. Stodola
*Attorney, Agent, or Firm*—Pollock, VandeSande & Priddy

[57] ABSTRACT

A flexible shaft-coupling device comprises an annular first coupling member having circumferentially spaced vanes extending radially inwardly from its inner periphery and a second coupling member located within the annular coupling member. The second coupling member has circumferentially spaced vanes extending radially outwardly so as to protrude into the spaces between the vanes of the first coupling members. Resiliently distortable pads are located between adjacent vanes to enable torque to be transmitted between the vanes by compression of the pads. The pads are formed of laminations of resilient and less resilient materials. The device may be located within one end of a hollow shaft connected to the annular first coupling member.

7 Claims, 5 Drawing Sheets

FIG. 7
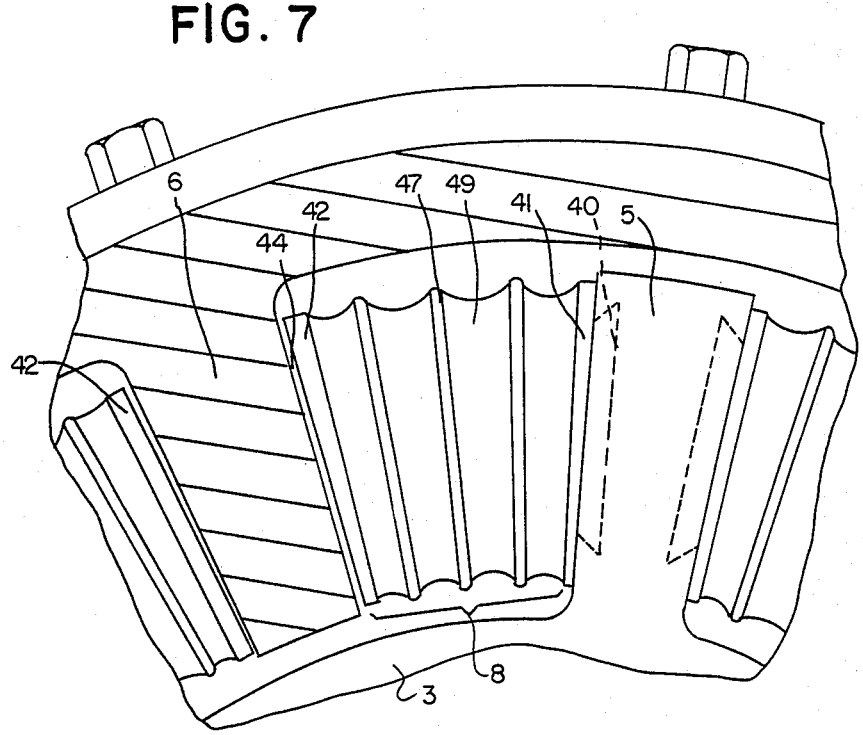
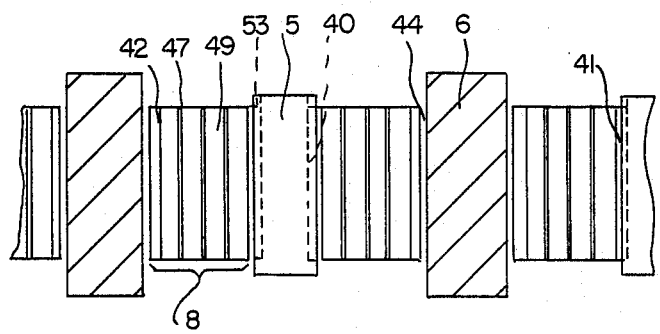
FIG. 8

4,816,007

RADIALLY INTERENGAGED VANE COUPLING WITH CIRCUMFERENTIALLY ARRANGED RESILIENT PADS

FIELD OF THE INVENTION

This invention relates to a rotatable flexible shaft-coupling device which comprises first and second coupling members each connectible drivingly to a respective shaft and flexibly coupled together for the transmission of torque between the coupling members.

DESCRIPTION OF THE RELATED ART

Flexible couplings are often used when either or both of the driving or driven members of a power train are flexibly mounted, because they are able to accommodate radial, axial and lateral misalignment.

The combination of radial and lateral misalignment results in a net angular misalignment. Some flexible couplings can also tolerate variation in the torque being transmitted, e.g. from the power stroke of a slow speed diesel engine, and thus act to smooth the torque irregularities; this property will give a more uniform output torque and may also reduce noise transmission along the power train. The present invention has been developed with a view to providing a flexible coupling which can meet all of the above requirements.

Flexible couplings can usually only accept axial or angular misalignment when used singly. It is thus common practice to use the couplings in pairs separated by a cardan shaft. This arrangement can accommodate both radial and axial misalignment, as well as increase the amount of axial and angular misalignment which can be tolerated. FIGS. 1 and 2 of the accompanying drawings show schematically a pair of conventional flexible couplings comprising coupling disc halves 101, 102 and coupling disc halves 101', 102' linking two shafts together by means of a cardan shaft 103. In FIG. 1 there is no misalignment. It will be noted in FIG. 2 that the conventional coupling is running at the limit of its misalignment capability, as the two coupling disc halves of the couplings are in contact. (NB. For clarity in FIGS. 1 and 2, the members connecting the two halves of each conventional coupling are not shown).

The general principle of a flexible shaft-coupling device according to the invention is shown schematically in FIGS. 3 and 4 of the accompanying drawings, wherein the coupling devices of the invention are denoted by reference numerals 111 and 112 and an annular cardan shaft linking the devices is denoted by reference numeral 113. It can be seen, from FIG. 4 that the coupling devices 111 and 112 can accommodate a similar degree of misalignment as FIGS. 2, and more, without difficulty. The coupling device of the invention can also accept a large degree of axial misalignment, this being limited only by the shear limits of the resilient components thereof, and not by the contact of the coupling disc halves as in the conventional coupling.

One way in which a conventional coupling may accommodate greater misalignment is to use a longer cardan shaft. However, this is not always possible due to space considerations of the machinery layout. Consequently, there is frequently a requirement to be able to accommodate large misalignments in relatively confined spaces, such as occur in marine drive transmission systems.

SUMMARY OF THE INVENTION

According to the invention there is provided a rotatable flexible shaft-coupling device comprising first and second coupling members each connectible drivingly to a respective shaft and flexibly coupled together for the transmission of torque between the coupling members characterised in that:

the first coupling member is an annular member having an inner periphery on which is provided a first set of circumferentially mounted vanes having circumferential spaces therebetween and extending radially inwardly from the annular member;

the second coupling member is arranged substantially co-axially and radially inwardly of said inner periphery of the first coupling member and has a second set of circumferentially mounted vanes which extend radially outwardly of the second coupling member so as to be located each in a respective one of the circumferential spaces defined between the vanes of the first set, whereby each vane of the second set subdivides its respective space into a pair of gaps; and a plurality of circumferentially spaced and resiliently distortable pads is arranged one in each of said gaps to provide for resilient and flexible torque transmission between the vanes of the first and second sets, each pad being composed of laminations of a first resilient material and a second material that is less resilient than the first material, and each pad being secured at one end to a vane at one end of its respective gap and being arranged to have at least partial freedom of motion at its opposite end relative to the vane at the other end of its gap, so that when rotational torque is passed between the first and second coupling members, said resiliently distortable elements will be loaded in a mainly compressive manner.

Thus, one end of each pad is firmly located in axial, radial and circumferential directions with one of the coupling members, whereas the other end of the pad is at least partly unrestrained e.g. completely unrestrained or partially or wholly restrained only in the radial and-/or axial direction, relative to the other of the coupling members, whereby the shaft-coupling device of the invention can readily compensate for any misalignments which occur between a pair of shafts which are to be coupled together by the coupling device of the invention, while still providing satisfactory transmission of torque between the shafts via the coupling device.

Preferably, the second coupling member comprises an annular member which may be coupled with its respective shaft by any suitable mechanical means, such as by bolts to a shaft flange. The first coupling member, which is an annular member which surrounds the first and second sets of vanes and also the distortable pads, may be secured to its respective shaft by any suitable mechanical means. However, in a preferred mode of use of the shaft-coupling device of the invention, the entire device is housed within one end of a hollow shaft, and particularly a hollow cardan shaft of the type suitable for use in a marine transmission system, and a rigid drive connection is established between the first coupling member and the inner periphery of the hollow shaft at the end thereof.

When the invention is applied to a drive transmission system incorporating a hollow cardan shaft, conveniently a pair of shaft-coupling devices of the invention is provided, one being arranged at and within each end of the hollow cardan shaft. The hollow cardan shaft may then have an internal diameter which corresponds generally with the overall external diameter of the coupling device, and may therefore be made of relatively lightweight construction.

In the application of the invention to a drive transmission system in which one direction of rotational motion is used predominantly, whereas the other direction of rotational motion is used for lower loads and only occasionally and/or for short periods e.g. a drive transmission to a marine propeller shaft, the resiliently distortable pads may be arranged so that those which are used to transmit torque between the vanes of the first and second set for said one predominant direction of rotational motion may be made to be thicker than the pads which are used to transmit torque for the other direction of rotation. Thus alternate pads may be of different thickness.

Preferably, of the pads which are employed for transmitting torque for said other direction of motion, one end is fast with one of the vanes whereas its opposite end may be completely unrestrained. A lubricant may therefore be provided to promote slippage of the unrestrained end, such as a low friction coating.

BRIEF DESCRIPTION OF THE DRAWINGS

A conventional arrangement of flexible couplings has already been described above, with reference to FIGS. 1 and 2 of the accompanying drawings, and a general and schematic illustration of the concept of a flexible shaft-coupling device of the invention has also been described with reference to FIGS. 3 and 4 of the accompanying drawings. A detailed description of one preferred embodiment of the invention will now be provided, by way of example only, to FIGS. 5 to 10 of the accompanying drawings, in which:

FIG. 7 is a detail and enlarged elevational view of the arrangement of a resilient pad used to transmit torque between cooperative radial vanes of the first and second coupling members;

FIG. 8 is a detail circumferential view looking radially inwards onto the pads of FIG. 7.

DESCRIPTION OF THE PREFERRED EMBODIMENTS

Figure 6:
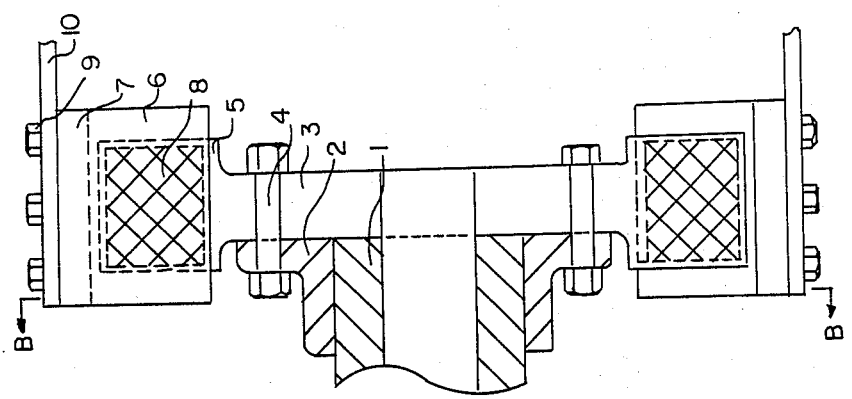
FIG. 6 is a sectional view taken on the line A—A in FIG. 5.
Figure 5:
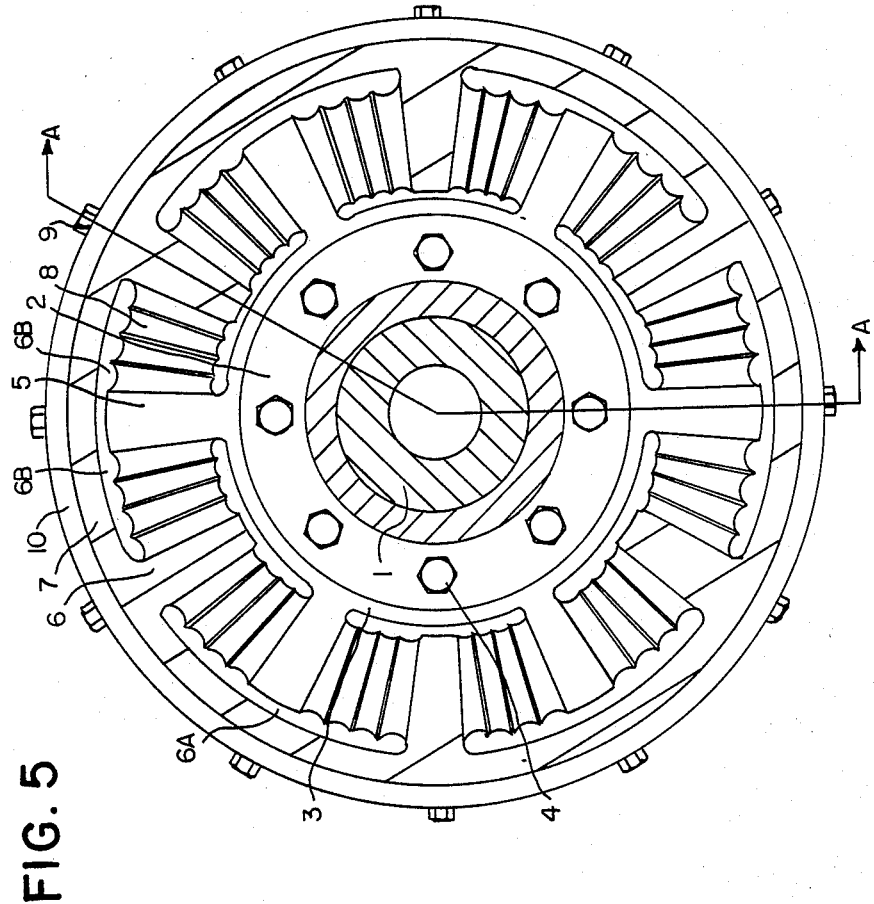
FIG. 5 is an elevational view of first and second coupling members of the preferred embodiment which are flexibly coupled together for the transmission of torque therebetween.

Referring now to FIGS. 5 and 6 of the drawings, there is shown a flexible shaft-coupling device which comprises a first coupling member 7 which is connectible drivingly to a respective shaft 10 and a second coupling member 3 which is connectible drivingly to a respective shaft 1. The first and second coupling members are flexibly coupled together for the transmission of torque between the coupling members.

The first coupling member 7 is an annular member having a first set of circumferentially spaced vanes 6 which are provided on the inner periphery of the annular member and which extend radially inwardly therefrom. The second coupling member 3 is arranged approximately co-axially and radially inwardly of the inner periphery of the first coupling member 7, and has a second set of circumferentially spaced vanes 5 which extend radially outwardly of the second coupling member 3 so as to be located each in a respective one of the circumferential spaces, designated generally by reference 6A, which are defined between the adjacent vanes 6 of the first set. Each vane 5 of the second set subdivides its respective space 6A in which it is received into a pair of gaps 6B with the adjacent vanes 6 of the first set.

A plurality of circumferentially spaced and resiliently distortable pads 8 is arranged one in each of the gaps 6B to provide for resilient and flexible torque transmission between the vanes 6, 5 of the first and second sets of vanes. As will be described in more detail below, and particularly with reference to FIGS. 7 and 8, each pad is composed of laminations of a first resilient material and a second material that is less resilient than the first material, and each pad is secured at one (radially extending) end to a vane at one end of the respective gap 6B and is arranged to have at least partial freedom of motion at its opposite (radially extending) end relative to the vane at the other end of the gap.

Thus, one end of each pad is firmly located in axial, radial and circumferential directions with one of the coupling members (3, 7), whereas the other end of the pad is at least partly unrestrained e.g. completely unrestrained or partially or wholly restrained only in the radial and/or axial direction, relative to the other of the coupling members, whereby the shaft coupling device of the invention can readily compensate for any misalignments which occur between a pair of shafts (1, 10) which are to be coupled-together by the coupling device, while still providing satisfactory transmission of torque between the shafts via the coupling device.

The second coupling member 3, which takes the form of an annular web, is coupled drivingly with shaft 1 via a ring of bolts 4, whereas the first coupling member 7 is coupled drivingly with shaft 10 via bolts 9. The radial vanes 5 are secured fast with the annular web 3, and extend radially outwards therefrom. The vanes 5 engage with an equal number of the vanes 6, which extend radially inwards from an annular portion of the first coupling member 7. The numbers of vanes (5, 6) in the first and second set are equal, so that the vanes can engage in an essentially co-axial manner. The flexible pads 8 are disposed between each adjacent pair of vanes 5 and 6, in both the forward and reverse senses of rotation, so that there are twice the number of flexible pads 8 as there are vanes in each set.

One end of each flexible pad 8 is fast with a radial vane at one end of gap 6B, but has some, or complete, freedom of motion at its opposite end relative to the radial vane at the other end of gap 6B. For a given direction of rotation, each load-bearing flexible pad 8 will be fast with one of the vanes of the same set. In the example shown, all flexible pads 8 are fast at one end with one of the radial vanes 5. However, it is equally possible that all pads 8 could be fast with one of the radial vanes 6. It is equally possible that all pads 8 which would carry load in the forward direction of rotation could be fast with one of radial vanes 5 and all pads 8 which would carry load in the reverse direction of motion could be fast with one of the radial vanes 6, or vice versa. It is possible that the pads 8 which would carry load in one direction of rotation would be fast to a mixture of vanes of both sets, but this would not normally be good engineering practice.

Figure 1:
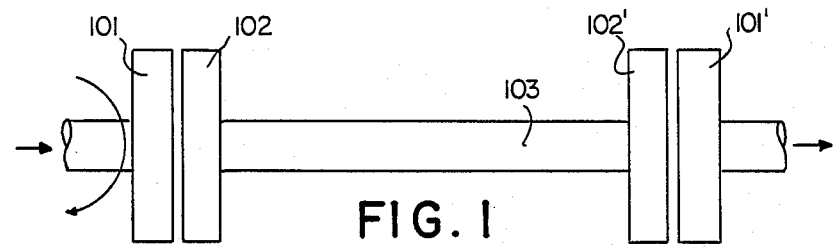
Figure 3:
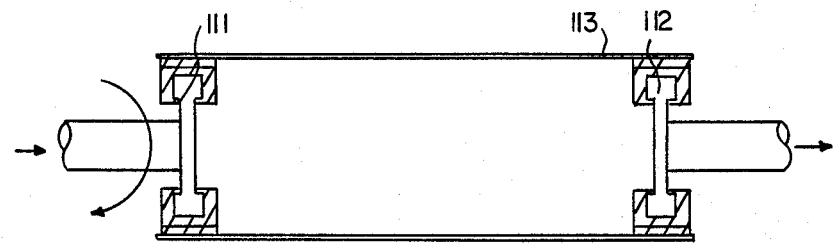
Figure 2:
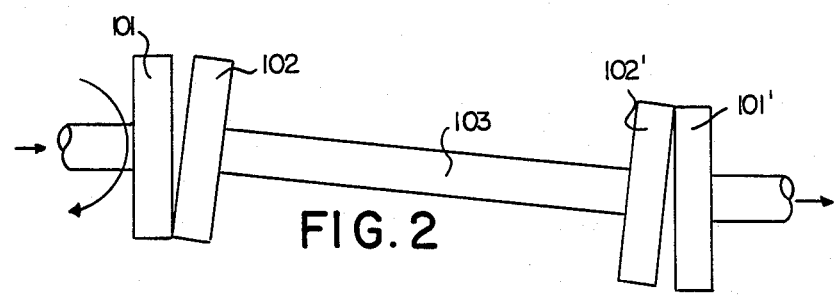
Figure 4:
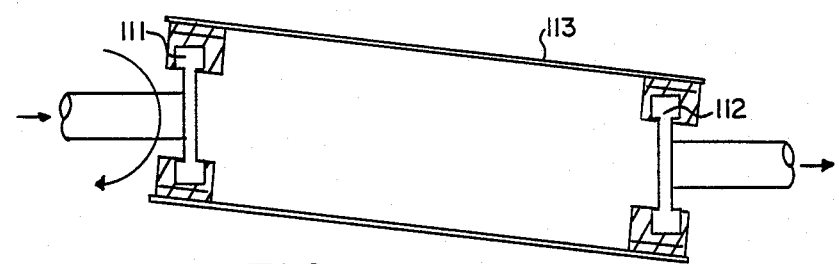

When shaft 1 is the input shaft, the drive would then pass from circumferential coupling member 7, via bolts 9, to shaft 10 which is an annular cardan shaft. It is normal practice to use two flexible couplings at either end of a cardan shaft, as shown in FIGS. 1 and 2. Thus for the second flexible coupling (not shown) at the other end of shaft 10, annular cardan shaft 10 would become the input member and the drive would thus pass via bolts 9, through circumferential member 7 (now acting as an input member), via radial vanes 6, flexible pads 8, radial vanes 5 and thence to shaft 1, now acting as the output member.

It will be noted that vanes 5 and 6 are integral with web 3 and member 7 respectively. These two components, 5, 3 and 6, 7, may be manufactured by any of several methods, including fabrication, casting and forging. Of these, forging has the advantage of providing better mechanical strength if care is taken to control the metallurgical properties. The coupling described herein is designed to take advantage of this, and in particular, to provide a grain direction giving best strength in the region of great stress, at the vane roots. Working to higher permitted stress levels has the advantage of enabling coupling size and weight to be reduced.

Referring now to FIG. 7, this shows in more detail the construction and arrangement of the pads between the vanes. FIG. 7 shows an enlarged view of one flexible pad 8, one of the set of radial vanes 5 and one of the set of radial vanes 6. The method of assembly of the coupling will now be described. The assembly would be done in a jig for alignment purposes. Annular web 3 carrying radial vanes 5 would be suitably mounted, e.g. on the end of a mandrel similar to flange 2 (FIG. 5) and the circumferential coupling member carrying vanes 6 would be mounted co-axially around it. The advantage of this method of mounting is that unrestricted access is available to one face of the coupling.

Figure 10:
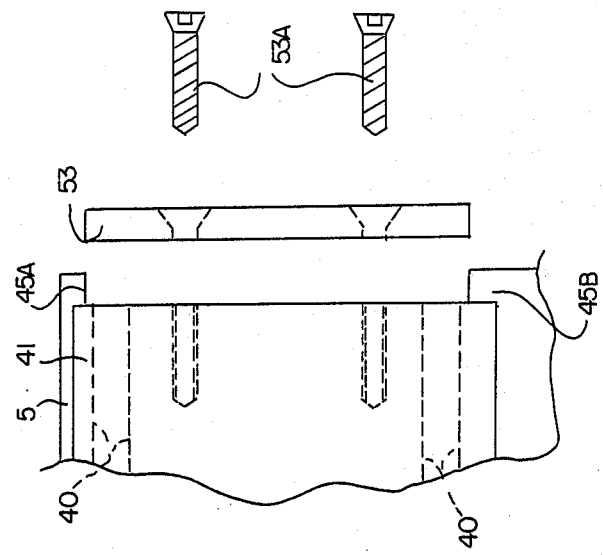
FIG. 10 is an exploded end view of the part of FIG. 9.
Figure 9:
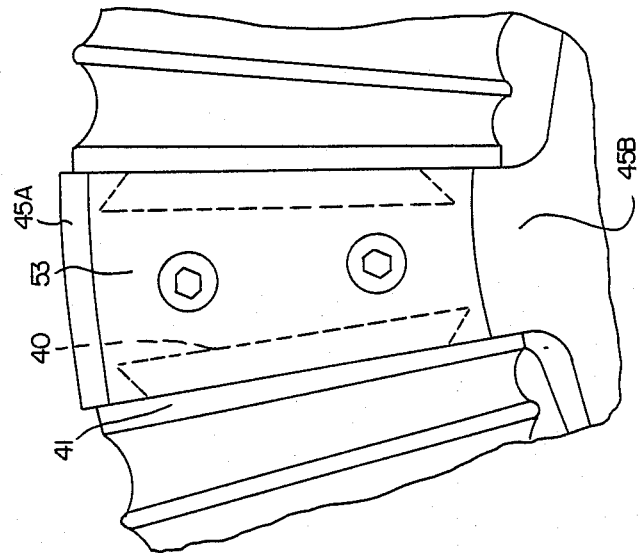
FIG. 9 is a detail view of a part of FIG. 7.

The pads may now be slid into place between adjacent radial vanes 5 and 6. In both faces of radial vanes 5, dovetail-shaped cut-outs 40 have been machined. The end faces of flexible pads 8 are formed by two end plates 41 and 42; one of these plates 41 is machined with a male dovetail to match dovetail cut-out 40. Thus, by aligning the male and female dovetails, pad 8 may be slid axially into place. A clearance 44 is provided at the other end of pad 8 where end plate 42 would bear on second radial vane 6 when under operational load; clearance 44 is essential to permit assembly of the coupling. When end plate 41 is fully home in dovetail slot 40, it may be secured in position by means of a keeper 53 (FIG. 8). The keeper is shown in more detail in FIGS. 9 and 10. The surface of the upper portion of each vane 5 is machined away to leave projections 45A and 45B. After the end plates 41 have been secured in the dovetail slots 40, the keeper 53 is secured in position with screws 53A. As is shown in FIG. 8, the keeper 53 overlaps the end of the dovetails of end plates 41 and secures them against movement in the axial direction.

Dovetail cut-outs 40 are merely quoted as one of many means by which end plates 41 may be secured to first radial vanes 5 and other suitable means will be obvious to the skilled person. Furthermore, for ease of manufacture, dovetail cut-outs may be machined right across the faces of radial vanes 5 and keeper plates 53 used at both ends of the cut-outs 40 to positively retain end plate 41 in both axial directions.

FIG. 7 shows that end plate 42 will bear directly onto the flat face of second radial vane 6 under operational load. In this case, the first end of pad 8 (i.e. dovetail end plate 41) is fully restrained in dovetail cut-out 40, i.e. it is fast with vane 45 in the radial, axial and circumferential directions (as defined by the axis through the coupling (FIG. 5)). In contrast, the second end of pad 8 (i.e. end plate 42) is completely unrestrained. For certain applications, it may be desirable for some restriction to be placed on the movement of the second end (end plate 42). This could be done by providing, in the faces of second radial vanes 6, shallow rectangular recesses (not shown) having sides perpendicular to the load bearing faces of vanes 6 into which end plates 42 would fit. If a keeper 53 is also used, end plate 42 will be restrained in the radial and axial directions, but not in the circumferential one. If a keeper 53 should not be used, end plate 42 will be restrained in only one of the two axial directions of motion.

When two flexible couplings are used in conjunction with a cardan shaft, as shown in FIGS. 1 and 2, recessing of the second ends of flexible pads 8 may be desirable to positively locate the annular cardan shaft (FIG. 2). However, this is not essential as there are other methods by which the annular cardan shaft may be located.

The nature and method of construction of the flexible pads 8 will now be described by reference to FIGS. 7 and 8. The flexible pads 8 consist of alternating thick layers of a suitable resilient substance 49, separated by thin layers of a suitable less resilient substance 47. At the ends of the pads 48 members of the same or another less resilient substance are used to facilitate fixing of the pad, i.e. dovetail end plate 41, and load bearing end plate 42. In practice, rubber may be used as the resilient substance with the particular formulation of the polymer being varied according to the bearing pressure on the pad, i.e. a combination of the torque being transmitted, the pad area and the number of pads carrying load. For the less resilient substance, steel may be used.

To fabricate a resilient pad 8, end plates 41 and 42 will be placed in a mould and a plurality of thin steel plates 47 added and held in a jig at the required angle and spacing. The mould is then filled with raw rubber which is then suitably polymerised or cured. This process results in a resilient substance, strongly bonded to the metallic plates and able to accept high compressive loading, being formed between end plates 41 and 42. Such a composite construction makes the pads very flexible under shear loading. Though rubber and steel have been quoted as examples of the resilient and less resilient substances respectively, a wide range of other substances and combinations of substances may be used depending on the duty required. It will be noted that all the metal plates 41, 42 and 47 (FIG. 7) extend to cover at least the full area of the rubber pads; this is necessary to protect the edges of the rubber sections where any failure would be likely to be initiated.

The flexible coupling thus described uses flexible rubber pads 8 to transmit the driving torque by direct compression of the pads. Misalignment is accommodated by shear of the rubber elements 49 of the pads. As an engineering material, rubber can withstand high compressive stress, moderate shear stress, but only very low tensile stresses. The presence of the metal plates 47 improves resistance to compressive stress, so that a relatively thick rubber/metal multi-layered pad can accommodate a much higher loading pressure than could a pad of the same thickness made only of rubber. A (circumferentially) thick pad is required to accommodate gross misalignment without the shear stress in the rubber reaching unacceptable levels. Thus, the design of flexible coupling disclosed herein is capable of transmitting high torques while accommodating high levels of axial, lateral and angular misalignment.

Reference to FIGS. 1 to 4 will show the advantage of the coupling of the invention over known art. FIG. 2 shows a conventional type of coupling at the limits of its misalignment (angular and lateral) capability, as the two halves of each coupling are in contact. However, the coupling of the invention shown in FIG. 4 has not reached the limit of its misalignment capability. Furthermore, if end plates 42 are not recessed into radial vanes 6, considerably greater misalignment than shown may be tolerated.

The conventional couplings shown in FIGS. 1 and 2 are separated by a massive cardan shaft, which is required to transmit the torque at the small radius of the shaft. However, the cardan shaft, with a coupling according to the invention, acts at a much greater effective radius and consequently a very much thinner section is required to transmit the same torque. This results in considerable weight savings, particularly if composite materials can be used instead of solid metal. By comparing the size of the conventional coupling elements with those of the coupling according to the invention (see FIGS. 1 to 4), it is obvious that the present coupling offers considerable weight savings whether used singly or as pairs with a cardan shaft. The use of composite materials e.g. fibre reinforced plastics, would result in less noise being transmitted along the cardan shaft than would pass along a conventional metal one, thus leading to a quieter coupling.

A further advantage of the present flexible coupling is that rubber pads 8 transmit the load between vanes 5 and 6, i.e. there is no metal-to-metal contact between input and output members. Thus the transmission of mechanical noise and vibration across the coupling will be greatly attenuated. This attenuation will be greater if two couplings are used as there will be two sets of rubber pads to act in series. A further advantage of rubber pads is that they are resilient and compressible under load. Thus if the torque being transmitted varies, the inertia of the cardan shaft assembly, together with the resilience of the rubber will act to reduce the torsional fluctuations, and minimise the possibility of torsional vibration. Such torsional damping would be particularly useful if the coupling was used to transmit drive from a petrol or diesel internal combustion engine, such engines by their nature exhibiting a cyclic torque variation, which cannot be fully eliminated by use of a flywheel.

Figure 11:
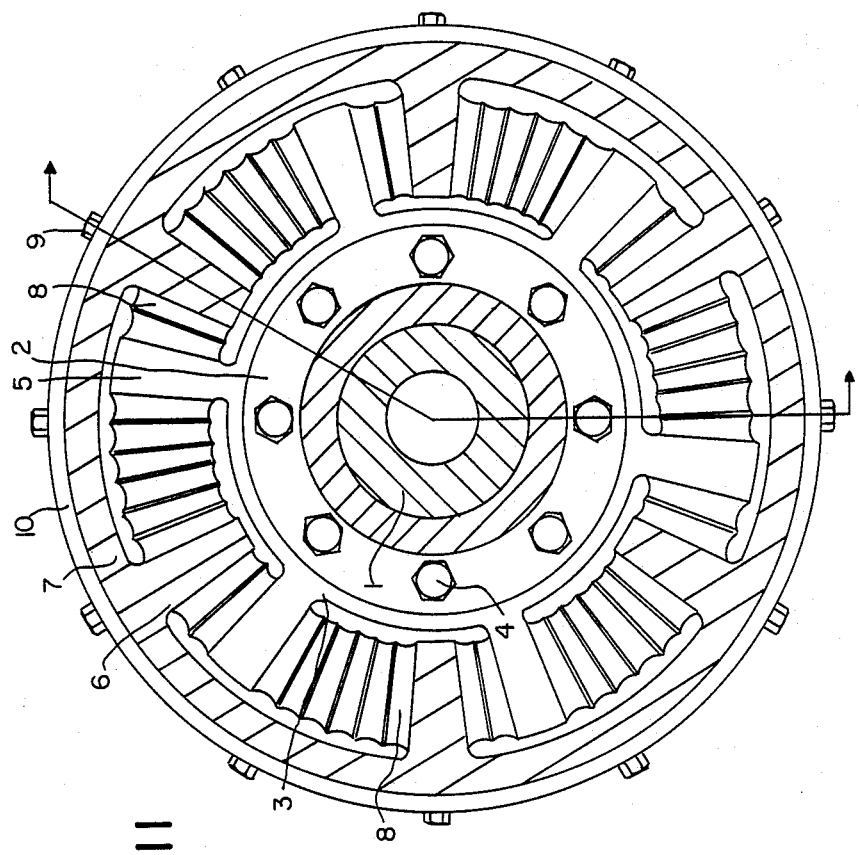
FIG. 11 corresponds to FIG. 5 and is a view of a different embodiment.

FIGS. 5, 6, 7 and 8 show a flexible coupling in which the pads to take the drive under forward and reverse directions of motion are of equal thickness i.e. alternate pads are of equal thickness. There are certain applications in which one particular direction of motion is used almost exclusively and the reverse direction is used only very occasionally and for short periods. Usually, but not always, in such cases the reverse torque is lower than that when rotating in the principle direction as shown in FIG. 11. In such cases, the thickness of the reverse pads may be reduced so that alternate pads are of unequal thickness. The advantage of this would be to permit an overall reduction in coupling diameter for a given power. In order for the thinner reverse pads to be able to accommodate the same degree of misalignment, it will be necessary to ensure that end plates 42 bear onto a flat surface of radial vanes 6, i.e. there must be no recess present. This will allow end plates 42 to slip over the surface of radial vanes 6 so that, in the reverse direction of rotation, misalignment can be accommodated by a combination of shear in the rubber and slippage of end plate 42 over the surface of radial vane 6. Slipping of the end plate 42 may be promoted by the use of low friction coatings.

It is thus possible to optimise the relative thicknesses of the forward and reverse pads within the overall coupling diameter in terms of:
  (i) Level of torque and power to be transmitted.
  (ii) Duration of operation.
  (iii) Degree of misalignment to be accepted and method by which it is to be accepted, i.e. pure shearing or a combination of shearing and slipping.
  (iv) Torsional irregularities, i.e. compressive modulus of rubber.

In FIGS. 5 to 7, vanes 5 and 6 have been shown as 'radial'. This has meant that the flexible pads 8 are wedge-shaped. For some applications, parallel-sided pads may be preferable. To use parallel-sided pads, the angle included between the two faces of first vanes 5 would be increased and that included between the two faces of second vanes 6 would be reduced. Alternatively, wedge-shaped end plates 41, 42 could be used instead. In other cases, e.g. for ease of manufacture, it may be desirable to have both first and second vanes 5, 6 parallel-sided. In this case, the wedge angle of the pads 8, may be appropriately increased. Alternatively wedge-shaped end plates 41, 42 could be used. A combination of wedge-shaped pads 8 and wedge-shaped end plates 41, 42 is also possible.

Though FIGS. 1 and 2 show two couplings connected together by a cardan shaft, it is equally possible for a single coupling to be used. In this case, the annular output member would be connected, via a disc-like member, to the output shaft.

I claim:

1. A rotatable flexible shaft-coupling device comprising first and second coupling members each connectible drivingly to a respective shaft and flexibly coupled together for the transmission of torque between the coupling members wherein:

the first coupling member is an annular member having an inner periphery on which is provided a first set of circumferentially mounted vanes having circumferential spaces therebetween and extending radially inwardly from the annular member;

the second coupling member is arranged substantially co-axially and radially inwardly of said inner periphery of the first coupling member and has a second set of circumferentially mounted vanes which extend radially outwardly of the second coupling member so as to be located each in a respective one of the circumferential spaces defined between the vanes of he first set, whereby each vane of the second set subdivides its respective space into a pair of gaps; and a plurality of circumferentially spaced and resiliently distortable pads is arranged one in each of said gaps to provide for resilient and flexible torque transmission between the vanes of the first and second sets, each pad being composed of laminations of a first resilient material and a second material that is less resilient than the first material, and each pad being secured at one end to a vane at one end of its respective gap and being completely unrestrained at its opposite end relative to the vane at the other end of its gap, so that when rotational torque is passed between the first and second coupling members, said resiliently distortable elements will be loaded in a mainly compressive manner.

2. A device as claimed in claim 1 wherein the second coupling member comprises an annular member.

3. A device as claimed in claim 1 wherein the device is housed within one end of a hollow shaft having an inner periphery and the first coupling member is rigidly connected to the inner periphery at said one end.

4. A device as claimed in claim 1 wherein alternate pads are of different thicknesses so that the pads which are used to transmit torque between the first and second sets of vanes in one direction of rotational motion are thicker than the pads which are used to transmit torque between the first and second sets of vanes in the other direction of rotation.

5. A device as claimed in claim 4 wherein said one direction of motion is a predominant direction of motion, said other direction of motion is a less predominant direction of motion.

6. A device as claimed in claim 5 wherein a lubricant is provided at said opposite end to promote slippage between the opposite end and the adjacent vane.

7. A coupling comprising first and second rotatable flexible shaft-coupling devices wherein
(i) the first of said devices comprises first and second coupling members each connectible drivingly to a respective shaft and flexibly coupled together for the transmission of torque between the coupling members wherein:
the first coupling member is an annular member having an inner periphery on which is provided a first set of circumferentially mounted vanes having circumferential spaces therebetween and extending radially inwardly from the annular member;
the second coupling member is arranged substantially co-axially and radially inwardly of said inner periphery of the first coupling member and has a second set of circumferentially mounted vanes which extend radially outwardly of the second coupling member so as to be located each in a respective one of the circumferential spaces defined between the vanes of the first set, whereby each vane of the second set subdivides its respective space into a pair of gaps; and
a plurality of circumferentially spaced and resiliently distortable pads is arranged one in each of said gaps to provide for resilient and flexible torque transmission between the vanes of the first and second sets, each pad being composed of laminations of a first resilient material and a second material that is less resilient than the first material, and each pad being secured at one end to a vane at one end of its respective gap and being completely unrestrained at its opposite end relative to the vane at the other end of its gap, so that when rotational torque is passed between the first and second coupling members, said resiliently distortable elements will be loaded in a mainly compressive manner,
(ii) the respective shaft of the first coupling member of the first of said devices is a hollow shaft within one end of which the first of said devices is housed and which has an inner periphery to which the first coupling member is rigidly connected at said one end,
(iii) the second of said devices comprises first and second coupling members each connectible drivingly to a respective shaft and flexibly coupled together for the transmission of torque between the coupling members wherein;
the first coupling member is an annular member having an inner periphery on which is provided a first set of circumferentially mounted vanes having circumferential spaces therebetween and extending radially inwardly from the annular member;
the second coupling member is arranged substantially co-axially and radially inwardly of said inner periphery of the first coupling member and has a second set of circumferentially mounted vanes which extend radially outwardly of the second coupling member so as to be located each in a respective one of the circumferential spaces defined between the vanes of the first set, whereby each vane of the second set subdivides its respective space into a pair of gaps; and
a plurality of circumferentially spaced and resiliently distortable pads is arranged one in each of said gaps to provide for resilient and flexible torque transmission between the vanes of the first and second sets, each pad being composed of laminations of a first resilient material and a second material that is less resilient than the first material, and each pad being secured at one end to a vane at one end of its respective gap and being completely unrestrained at its opposite end relative to the vane at the other end of its gap, so that when rotational torque is passed between the first and second coupling members, said resiliently distortable elements will be loaded in a mainly compressive manner, and
(iv) the respective shaft of the first coupling member of the second of said devices is said hollow shaft, the second of said devices being housed within a second end of said hollow shaft and the first coupling member of the second of said devices being rigidly connected to said inner periphery of said hollow shaft at said second end.

* * * * *